United States Patent
Sharp et al.

(10) Patent No.: US 10,971,111 B2
(45) Date of Patent: *Apr. 6, 2021

(54) PROVIDING A REPRESENTATION FOR A DEVICE CONNECTED TO A DISPLAY DEVICE

(71) Applicant: Roku, Inc., Los Gatos, CA (US)

(72) Inventors: David Sharp, San Jose, CA (US); Jeff Bush, San Jose, CA (US); Jim Funk, Los Altos, CA (US); Wim Michiels, San Jose, CA (US); Dale Luck, Los Gatos, CA (US)

(73) Assignee: Roku, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/811,392

(22) Filed: Mar. 6, 2020

(65) Prior Publication Data

US 2020/0211498 A1    Jul. 2, 2020

Related U.S. Application Data

(63) Continuation of application No. 15/829,256, filed on Dec. 1, 2017, now Pat. No. 10,593,287, which is a
(Continued)

(51) Int. Cl.
*G09G 5/00* (2006.01)
*H04N 21/45* (2011.01)
(Continued)

(52) U.S. Cl.
CPC ....... *G09G 5/006* (2013.01); *H04N 21/25825* (2013.01); *H04N 21/4532* (2013.01);
(Continued)

(58) Field of Classification Search
None
See application file for complete search history.

(56) References Cited

U.S. PATENT DOCUMENTS

| 8,078,766 | B2* | 12/2011 | Takenaka | G06F 3/1423 |
| | | | | 710/10 |
| 9,613,586 | B2 | 4/2017 | Sharp et al. | |

(Continued)

OTHER PUBLICATIONS

Non-Final Office Action for U.S. Appl. No. 14/755,753, dated Jun. 15, 2016, 26 pages.
(Continued)

*Primary Examiner* — Joni Hsu
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for providing a representation to a connected device. An embodiment operates by recognizing a new device connected to a display device, collecting device fingerprint information from the new device, and requesting a device class representation information determined based on the device fingerprint information. Another embodiment operates by receiving device fingerprint information from a display device via a network connection, wherein the device fingerprint information is collected from a device connected to a display device, and providing device class representation information to the display device via the network connection, when the device class representation information corresponding to the device fingerprint information is available.

20 Claims, 7 Drawing Sheets

Related U.S. Application Data continuation of application No. 15/436,041, filed on Feb. 17, 2017, now Pat. No. 9,865,225, which is a continuation of application No. 14/755,753, filed on Jun. 30, 2015, now Pat. No. 9,613,586.

(60) Provisional application No. 62/096,527, filed on Dec. 23, 2014.

(51) Int. Cl.
*H04N 21/258* (2011.01)
*H04N 21/475* (2011.01)
*H04N 21/00* (2011.01)

(52) U.S. Cl.
CPC ....... *H04N 21/475* (2013.01); *G09G 2370/02* (2013.01); *G09G 2370/042* (2013.01); *G09G 2370/10* (2013.01); *G09G 2370/12* (2013.01); *H04N 21/00* (2013.01)

(56) References Cited

U.S. PATENT DOCUMENTS

| | | | |
|---|---|---|---|
| 9,865,225 | B2 | 1/2018 | Sharp et al. |
| 10,593,287 | B2 | 3/2020 | Sharp et al. |
| 2002/0133581 | A1 | 9/2002 | Schwartz et al. |
| 2005/0223386 | A1* | 10/2005 | Suthapong .......... G06F 11/2294 719/313 |
| 2007/0081486 | A1 | 4/2007 | Koide |
| 2009/0164293 | A1 | 6/2009 | Coley |
| 2010/0333202 | A1 | 12/2010 | Von Der Lippe et al. |
| 2011/0138064 | A1 | 6/2011 | Rieger et al. |
| 2012/0117595 | A1* | 5/2012 | Svendsen ................. H04N 5/76 725/39 |
| 2013/0036431 | A1* | 2/2013 | Douceur ............... G06F 9/4411 719/327 |
| 2013/0179561 | A1 | 7/2013 | Tripathi et al. |
| 2013/0262246 | A1 | 10/2013 | Matsumura |
| 2014/0179230 | A1* | 6/2014 | Sydir .................... H04W 4/025 455/41.2 |
| 2015/0269912 | A1 | 9/2015 | Chen |
| 2016/0034594 | A1 | 2/2016 | Baldwin et al. |
| 2016/0180806 | A1 | 6/2016 | Sharp et al. |
| 2017/0162169 | A1 | 6/2017 | Sharp et al. |
| 2018/0082657 | A1 | 3/2018 | Sharp et al. |

OTHER PUBLICATIONS

Notice of Allowance for U.S. Appl. No. 14/755,753, dated Nov. 17, 2016, 5 pages.

Non-Final Office Action for U.S. Appl. No. 15/436,041, dated Mar. 21, 2017, 29 pages.

Notice of Allowance for U.S. Appl. No. 15/436,041, dated Aug. 25, 2017, 8 pages.

Non-Final Office Action for U.S. Appl. No. 15/829,256, dated Jun. 17, 2019, 21 pages.

Notice of Allowance for U.S. Appl. No. 15/829,256, dated Oct. 28, 2019, 5 pages.

* cited by examiner

PROVIDING A REPRESENTATION FOR A DEVICE CONNECTED TO A DISPLAY DEVICE

CROSS REFERENCE TO RELATED APPLICATIONS

This application is a continuation of U.S. Non-Provisional application Ser. No. 15/829,256, filed on Dec. 1, 2017, which is a continuation of U.S. Non-Provisional application Ser. No. 15/436,041, filed on Feb. 17, 2017, now U.S. Pat. No. 9,865,225, which is a continuation of U.S. Non-Provisional application Ser. No. 14/755,753, filed on Jun. 30, 2015, now U.S. Pat. No. 9,613,586, which claims the benefit of U.S. Provisional Application No. 62/096,527, filed on Dec. 23, 2014, all of which are herein incorporated by reference in their entireties.

BACKGROUND

Field

This disclosure is generally directed to display devices that may be operatively coupled to one or more devices. More particularly, this disclosure relates to providing a representation for a device connected to a display device.

Background

Generally, standardized audio and video (A/V) interfaces (e.g., High-Definition Multimedia Interface (HDMI), DisplayPort (DP), IEEE 1394 "FireWire", etc.) may be used for transferring audio and/or video data from one standard compliant device to another. In some standardized audio and/or video interfaces, specific features may allow a user to operate multiple standard compliant devices with a single remote control. While such a capability is appealing in theory, the practical reality is more challenging. Consider the case of a high definition display device. When a consumer connects a device to a port of the display device, the display device home screen may display information from the connected device. However, such information is rarely in a form that is useful to a consumer. Consequently, it may be difficult for the consumer to select the desired input for output on the display device. Accordingly, it would be desirable to provide improved techniques for providing a representation for a device connected to the display device.

SUMMARY

Provided herein are system, apparatus, article of manufacture, method and/or computer program product embodiments, and/or combinations and sub-combinations thereof, for providing a representation for a device connected to a display device.

An embodiment includes a computer implemented method for providing a representation for a device connected to a display device. The method may operate by receiving a first device fingerprint information from a first display device, wherein the first device fingerprint information is collected from a device connected to the first display device. The method may continue to operate by comparing the received first device fingerprint information with crowd sourced representation information stored in a device representation database. Based at least on that comparison, the method may further operate by determining that the device connected to the first display device is an unknown device based on the received first device fingerprint information and transmitting an indication to the first display device indicating that first device class representation information is not available for the device connected to the first display device.

Another embodiment includes an apparatus for providing a representation for a device connected to a display device. The apparatus, which may be a server, may include at least one processor and a memory coupled to the at least one processor configured to receive a first device fingerprint information from a first display device, wherein the first device fingerprint information is collected from a device connected to the first display device. The at least one processor may be further configured to compare the received first device fingerprint information with crowd sourced representation information stored in a device representation database. Based at least on that comparison, the at least one processor may determine that the device connected to the first display device is an unknown device based on the received first device fingerprint information and transmit an indication to the first display device indicating that first device class representation information is not available in the device representation database.

A further embodiment includes a tangible computer-readable device having instructions stored thereon that, when executed by at least one computing device, causes the at least one computing device to perform operations. The operations may include receiving a first device fingerprint information from a first display device, wherein the first device fingerprint information is collected from a device connected to the first display device. The operations may continue by comparing the received first device fingerprint information with crowd sourced representation information stored in a device representation database. Based at least on that comparison, the operations may further include determining that the device connected to the first display device is an unknown device based on the received first device fingerprint information and transmitting an indication to the first display device indicating that first device class representation information is not available.

BRIEF DESCRIPTION OF THE FIGURES

The accompanying drawings are incorporated herein and form a part of the specification.

Figure 1:
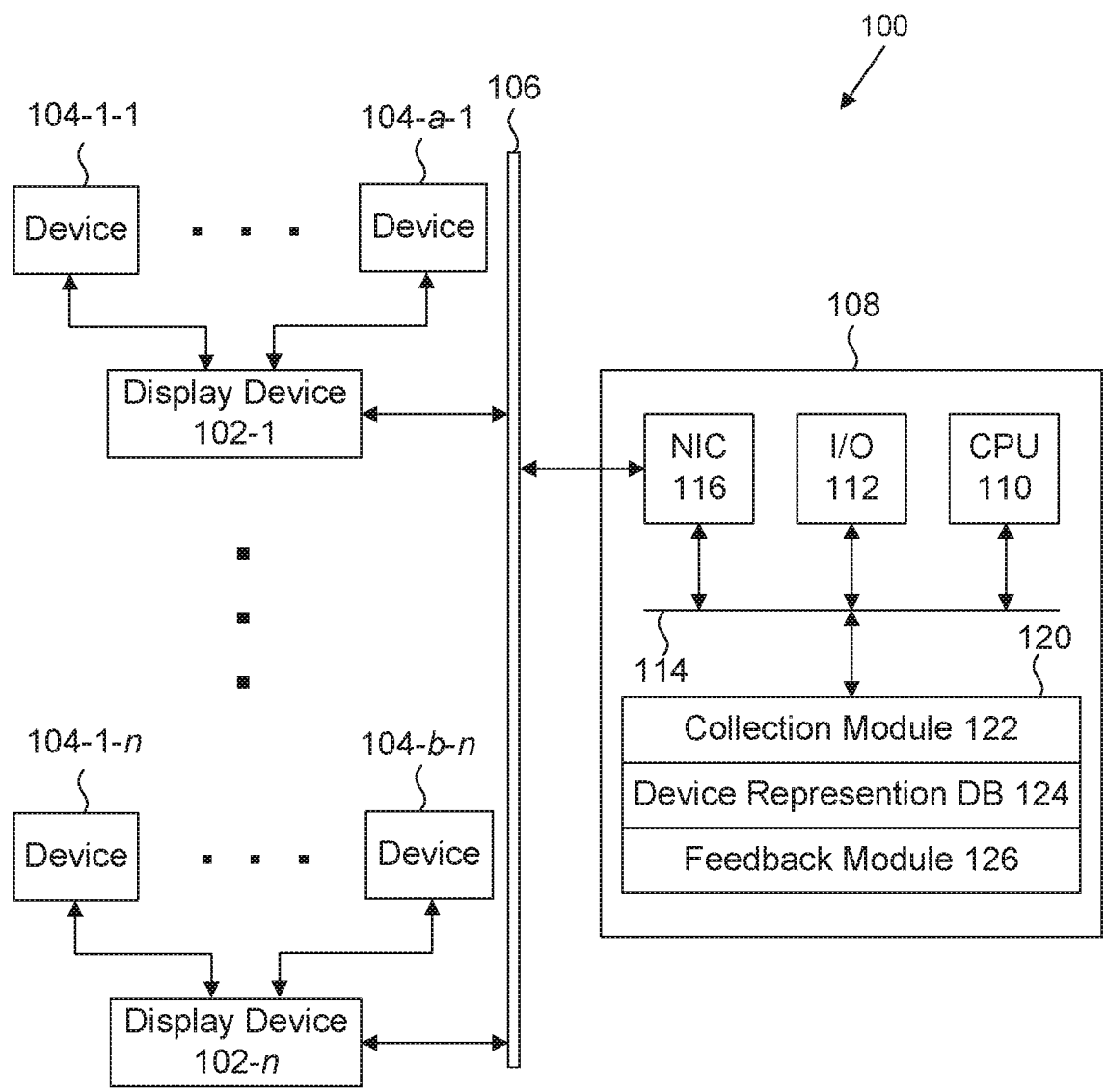
FIG. 1 illustrates a block diagram of a device representation system configured according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a complete set of elements 104-*a*-1 may include elements 104-1-1, 104-2-1, 104-3-1, and 104-4-1.

DETAILED DESCRIPTION

Overview

Various embodiments are directed to a device representation system for providing a device representation connected to a display device. In an embodiment, the display device (e.g., a television, etc.) may automatically provide a new representation for a newly connected device by querying one or more newly connected devices for device fingerprint information, requesting device class representation information including, without limitation, a device class name based on the device fingerprint information from a server, and/or updating the one or more user interface views (e.g., a connected device user interface view for selecting an input source) with a received device class representation information including, without limitation, a suggested device class name, that may be easily recognized by a user. The display device may also optionally enable the user to override or rename a suggested device class name by selecting a new device class name. Additionally or alternatively, the display device may also enable a user to select a new device class name when the server indicates that a suggested device class name is not available for the newly connected device. The display device may then provide the device class name selected by the user to the server.

To enable one or more display devices to automatically provide at least a suggested device class name for a newly connected device, in an embodiment, a server may receive device fingerprint information from one or more display devices and provide device class representation information to the respective display device based on the corresponding received device fingerprint information. The server may also receive device fingerprint information and corresponding user selected device class name from the one or more display devices, where the aggregate of the received information from the one or more display devices may represent crowd sourced representation information. The crowd sourced representation information may then be used by the server to provide at least a suggested device class name with an associated reliability indicia to one or more display devices.

At least one technical advantage that may be realized in various embodiments is that by having the device representation system automatically identify connected devices, the device representation system may save the users from unwanted tech oriented work and effort. Another technical advantage that may be realized is that by automatically detecting and providing a representation for a newly connected device, the display device may be configured for use with a new device as soon the new device is connected to the display device with minimal or no user interaction. This may further ensure that ports of the display device are provided with at least a proper representation that is easy to recognize and use for the users. It may be appreciated that these are merely a few of the features and advantages of the device representation system, and other features and advantages are further discussed below with reference to the figures.

DETAILED DISCUSSIONS OF EXAMPLE EMBODIMENTS

FIG. 1 illustrates a block diagram of an example device representation system 100 configured according to an example embodiment. In an embodiment, the system 100 may include a set of display devices 102-*n* (e.g., televisions, monitors, etc.). Each display device (e.g., display device 102-1, display device 102-2, etc.) may be associated with one or more devices (e.g., one or more associated devices 104-*a*-1, 104-*b*-2, etc.). For example, display device 102-1 may be associated with device 104-1-1 which may be a cable box, while display device 102-*n* may be associated with device 104-1-*n* which may be a high definition (HD) digital video disc (DVD) player. The examples are not limited in this context.

In an embodiment, the one or more associated devices (e.g., devices 104-*a*-1, 104-*b*-2, etc.) may also be operatively coupled and/or connected to their respective display devices (display device 102-1, 102-2, etc.) via one or more audio and/or video interfaces, so that the one or more devices (e.g., devices 104-*a*-1, 104-*b*-2, etc.) may communicate and provide audio and/or video information to their associated display device (e.g., display device 102-1, 102-2, etc.) for visual presentation on one or more displays (not shown) operatively coupled and/or connected to the display device (e.g., display device 102-1). In various embodiments, devices (e.g., devices 104-*a*-1, 104-*b*-2, etc.) operatively coupled and/or connected to the display devices 102-*n* may include, without limitation, a cable box, a streaming media device, an HD DVD player, a Blu-ray Disc player, a camera, a game console, a personal computer, a tablet computer, a mobile phone, and/or any other device configured to provide audio and/or video information to the associated display devices 102-*n*. Furthermore, the one or more devices (e.g., device 104-*a*-1, device 104-*b*-2, etc.) may be operatively coupled and/or connected to their respective display device (e.g., display device 102-1, 102-2, etc.) through a variety of interfaces (e.g., HDMI, HDCP, etc.).

In an embodiment, each display device (e.g., display device 102-1, 102-2, etc.) may be operatively coupled and/or connected to a network 106, which may be any combination of optical, wired, and/or wireless networks. Thus, each display device (display device 102-1, 102-2, etc.) may be a network (e.g., intranet, extranet, Internet, etc.) enabled display device with the capacity to send information to the network 106 and/or receive information from the network 106. For example, one or more display devices 102-*n* may communicate and transmit and/or receive information with server 108 via network 106.

In an embodiment, server 108 may include one or more standard components, such as a central processing unit (CPU) component 110 operatively coupled and/or connected to one or more input/output (I/O) components 112 via a system bus 114. The system bus 114 may be generally arranged to provide an interface between the one or more standard components. The one or more I/O components 112 may be operatively coupled and/or connected to one or more I/O devices which may include, without limitation, a keyboard, mouse, display, flash drive, head phones, speakers, and the like. A network interface component 116 may also be connected to the system bus 114 to provide the server 108 with connectivity to the network 106. A memory 120 may also be connected to the system bus 114, where the memory 120 may store instructions, that when executed by the CPU component 110, causes the CPU component 110 to implement the various embodiments discussed herein.

In an embodiment, the memory 120 may store a collection module 122. The collection module 122 may include CPU component 110 executable instructions to collect device fingerprint information and corresponding device class names, device class image, and/or display device identifier.

As further discussed below, in an embodiment, the collected device fingerprint information is information related to the corresponding device. For example, the device fingerprint information may identify, characterize, specify or otherwise pertain to the corresponding device. The device fingerprint information may include, for example and without limitation, vendor identification, product identification, on screen display information, and/or any other information that may be utilized in the identification of the new device. Also discussed below, display devices 102-n may send to the server 108 via the network 106 device fingerprint information, when one or more new devices (e.g., device 104-1-1, 104-2-1, etc.) are connected to display devices 102-n. As a result, a device representation database 124 may be maintained, updated, and/or created. In an embodiment, device representation database 124 may be generated from crowd sourced representation information, which may include, without limitation, device fingerprint information and corresponding device class representation information received from the display devices 102-1 through 102-n. The device representation database 124 may also be augmented by information supplied by device manufacturers (e.g., supplied information that specifies that the following device fingerprint information corresponds to device class representation information for a cable box). The memory 120 may also store a feedback module 126. The feedback module 126 may include instructions executed by the CPU component 110 to supply or provide device class representation information to a display device 102 via the network 106, when the received device fingerprint information corresponds to device class representation information stored in the device representation database 124. The device class representation information may include, without limitation, a device class name, a reliability indicia associated with the device class name, a device class image associated with the device class name, or any combination thereof.

Figure 7:
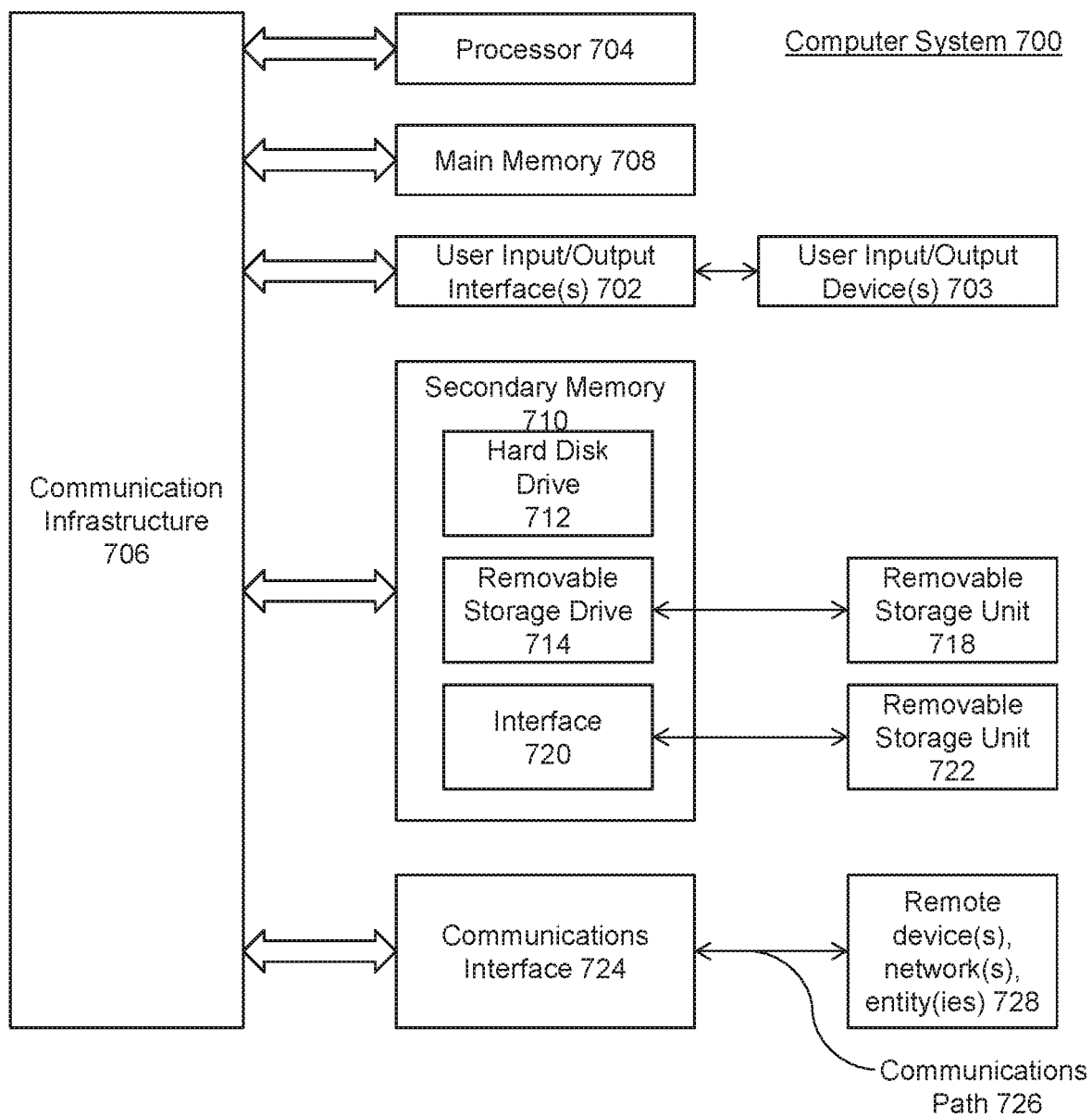
FIG. 7 illustrates an example computer system useful for implementing various embodiments.

It may be appreciated that while server 108 is illustrated to include one or more hardware/software components and/or modules, some or all components and/or modules of the server 108, may be virtualized in one or more virtual machines executing on a computing system, such as, for example, computer system 700 further discussed with respect to FIG. 7. Additionally or alternatively, the various components and/or modules may be virtualized and distributed between and among one or more virtual machines executing on one or more computing systems (e.g., computer system 700) interconnected via one or more networks (e.g., intranet, extranet, Internet, etc.) in order to provide the functionality of the one or more hardware/software components and/or modules of the server 108 as one or more cloud computing services. The one or more cloud computing services may include, without limitation, infrastructure as a service (IaaS), platform as a service (PaaS), software as a service (SaaS), or any combination thereof. The one or more services may then operate and communicate with the one or more display devices 102-n in a substantially similar manner as discussed with respect to server 108.

Figure 2:
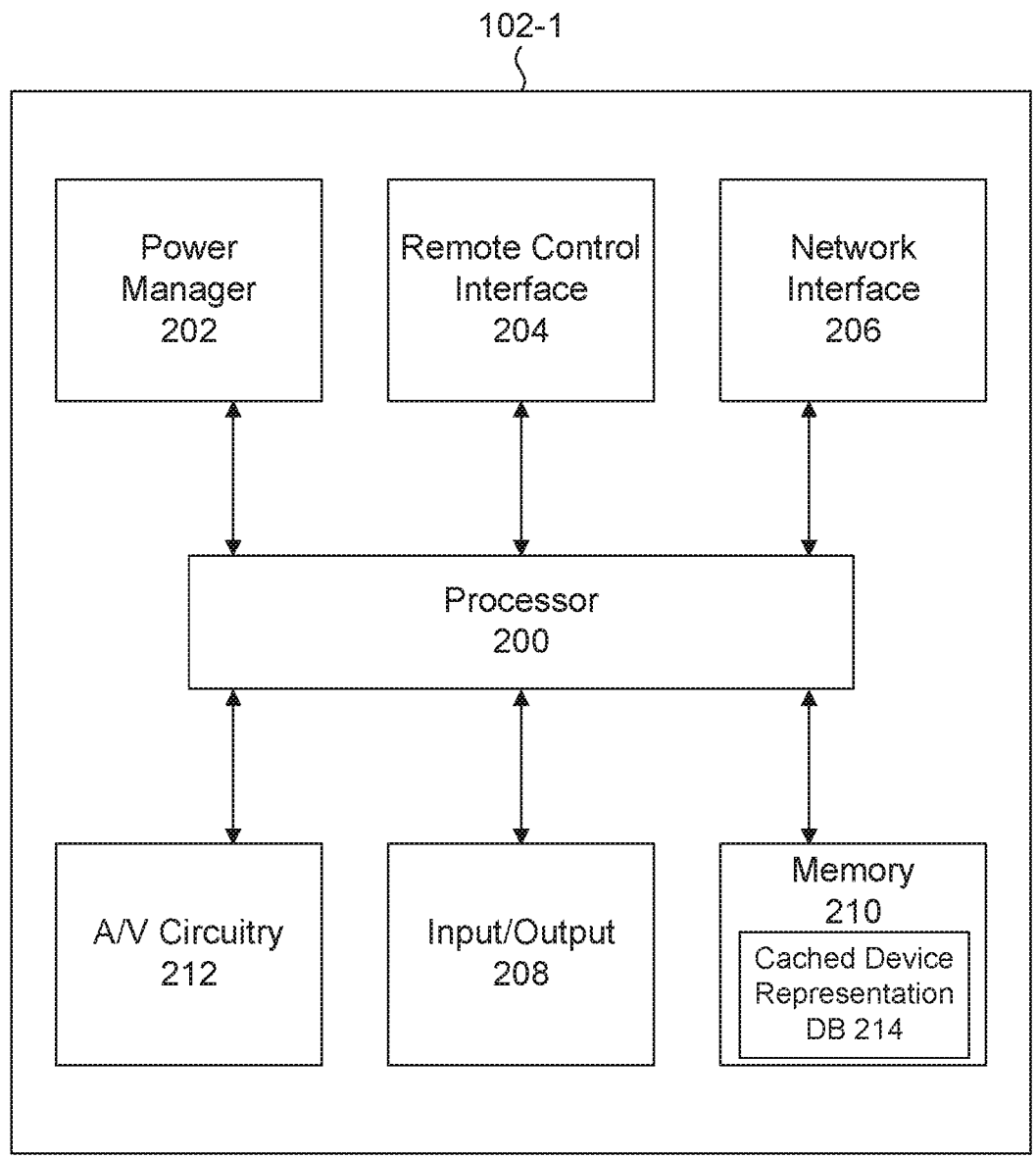
FIG. 2 illustrates components of a display device according to an example embodiment.

FIG. 2 provides an example configuration for a display device 102-1. As previously indicated, the one or more display devices 102-n may be configured to access the network 106 (e.g., intranet, extranet, and/or Internet, etc.). For example, the one or more display devices 102-n may be configured to access and exchange information with server 108. In an embodiment, the one or more display devices 102-n may be utilized to exchange device fingerprint information and device class representation information with the server 108.

The display device 102-1 may include a processor 200, power manager 202, remote control interface 204 (e.g., an interface to an Infrared remote control, radio frequency remote control, a smartphone with a remote control application, etc.) and network interface 206 (e.g., interface to network 106). The display device 102 may also include audio/visual circuitry 212 (e.g., circuitry and associated acoustic transducers and/or displays), input/output ports 208 (e.g., HDMI ports, DP ports, IEEE 1394 "FireWire" ports, and/or any other ports) and memory 210. The memory 210 may store instructions executed by the processor 200 to implement the processing further discussed in connection with FIG. 3.

The processor 200 may utilize a central processing unit (CPU). In another embodiment, the processor 200 may also utilize a graphics processing unit (GPU), which may be integrated with the CPU or may be configured to be physically separate. In an embodiment, the internal memory 210 may include one of or a combination of random access memory (RAM), flash memory, and read only memory (ROM). Additional memory and memory interfaces may be provided in various embodiments to support memories such as external storage, which may include hard disks, Universal Serial Bus (USB) drives, Secure Digital (SD) cards, and the like. These memories may also be used for storage of applications, programs, buffered media, media, executable computer code, software keys, databases, and/or the like.

In an embodiment, the internal memory 210 may further include a cached device representation database 214, which may include, without limitation, a database or a map of device fingerprint information for one or more devices (e.g., 104-a-1, 104-b-2, etc.) to corresponding device class representation information. The device fingerprint information and corresponding device class representation information stored in the cached device representation database 214 may include information provided by one or more device manufacturer supplier, downloaded or received periodically from server 108, and/or may have been user selected device class representation information for a particular device having associated device fingerprint information.

The remote control interface 204 may enable an input device (e.g., a web browser interface, a smartphone application, remote control, etc.) to apply or communicate one or more commands to display devices 102-n. In an embodiment, the remote control interface 204 may be configured to communicate with the input device through a wireless interface such as Bluetooth (BT), radio frequency (RF) and infrared (IR). In an embodiment, the remote control interface 204 may support the functionality through an input device including any combination of virtual buttons embodied on a customization screen, physical buttons, accelerometer, gyroscope, pressure sensor, tilt sensor, magnetic sensor, microphone, light sensor and the like.

In an embodiment, the I/O interface 208 supports multiple audio/video input/output ports which may include, without limitation, HDMI, DP, Red-Green-Blue (RGB) component video, Separate Video (S-video), Digital Visual Interface (DVI), Video Graphics Array (VGA), Mobile High-Definition Link (MHL), composite video, analog audio, and/or Sony®/Philips® Digital interface (S/PDIF) digital audio. In an embodiment, the input/output ports may further include, without limitation, USB and Apple® Thunderbolt® ports.

In an embodiment, network interface 206 may support multiple network interfaces which may include, without limitation, Fiber Channel over Ethernet (FCoE), Ethernet, Wi-Fi, and/or Bluetooth. In another embodiment, the network interface 206 may also support coaxial, digital TV antenna, and/or satellite television.

Figure 3:
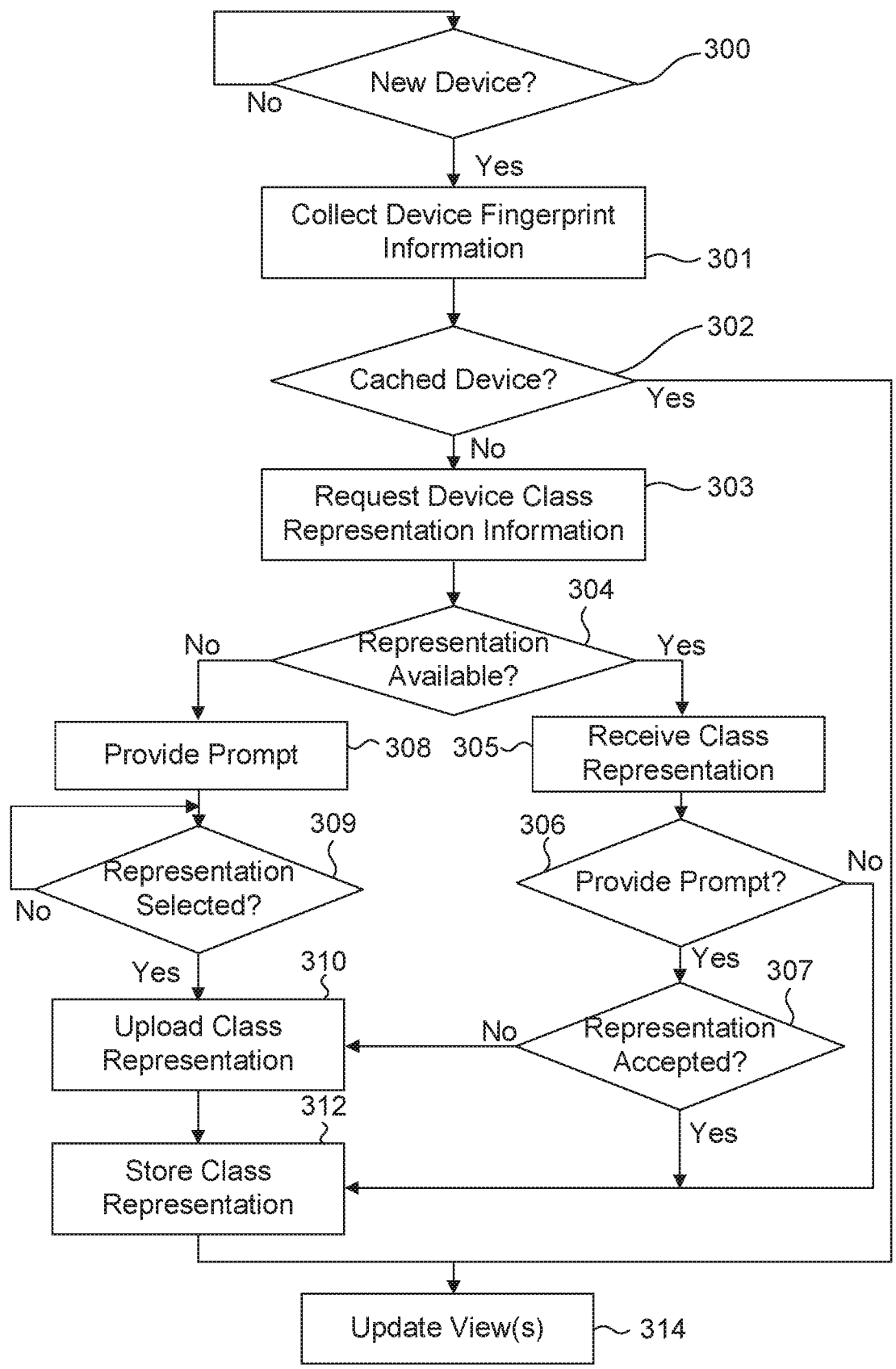
FIG. 3 illustrates processing operations associated with a display device configured according to an example embodiment.

FIG. 3 illustrates processing operations performed by one or more display devices 102-n configured according to an example embodiment. Processor 200 of the one or more display devices 102-n may perform these operations under control of instructions stored in memory 210.

In step 300, the display device 102-1 may be operative to identify or recognize a new device connected to the display device 102-1. For example, each port on the display device 102-1 may be monitored or scanned for a new connection (e.g., a new HDMI connection, etc.) from a new device.

In an embodiment, the display device 102-1 may monitor or scan for a new connection on one or more ports during one or more power states or during a transition from one power state to another power state (e.g., powered off state to power on state, sleep state to power on state, etc.) associated with the display device 102-1. For example, display device 102-1 may monitor for a new connection on one or more ports during a power on state (e.g., the display device 102-1 is powered on) and/or during a transition from power off state to a power on state.

If a new connection exists or is otherwise recognized by the display device 102-1 (step 300—Yes), then in step 301, the display device 102-1 may request or collect device fingerprint information from the new device by sending one or more commands (e.g., HDMI Consumer Electronics Control (CEC) commands, etc.) to the new device. The display device 102-1 may then receive the device fingerprint information from the new device, which may include, without limitation, vendor identification (e.g., identifier associated with a manufacturer of a device, etc.), product identification (e.g., identifier associated with the actual device, etc.), on screen display information (e.g., an identifier associated with the device arranged for visual presentation on a display, etc.), and/or any other information that may be utilized in the identification of the new device.

After collecting the device fingerprint information for the new device, in step 302, the display device 102-1 may determine whether the new device is a cached device. For example, display device 102-1 may determine whether the newly connected device is a cached device by searching the cached device representation database 214 for a matching device fingerprint information associated with the new device. The cached device may include, without limitation, any device (e.g., devices 102-a-1, device 102-b-2, etc.) that may have an associated device fingerprint information and corresponding device class representation information stored in the cached device representation database 214. It may be appreciated that cached device representation database 214 may include information for devices that may have been supplied by device manufacturers (e.g., preprogrammed, etc.), downloaded, received, and/or updated periodically from server 108, and/or user selected device class representation information for the device.

Figure 5:
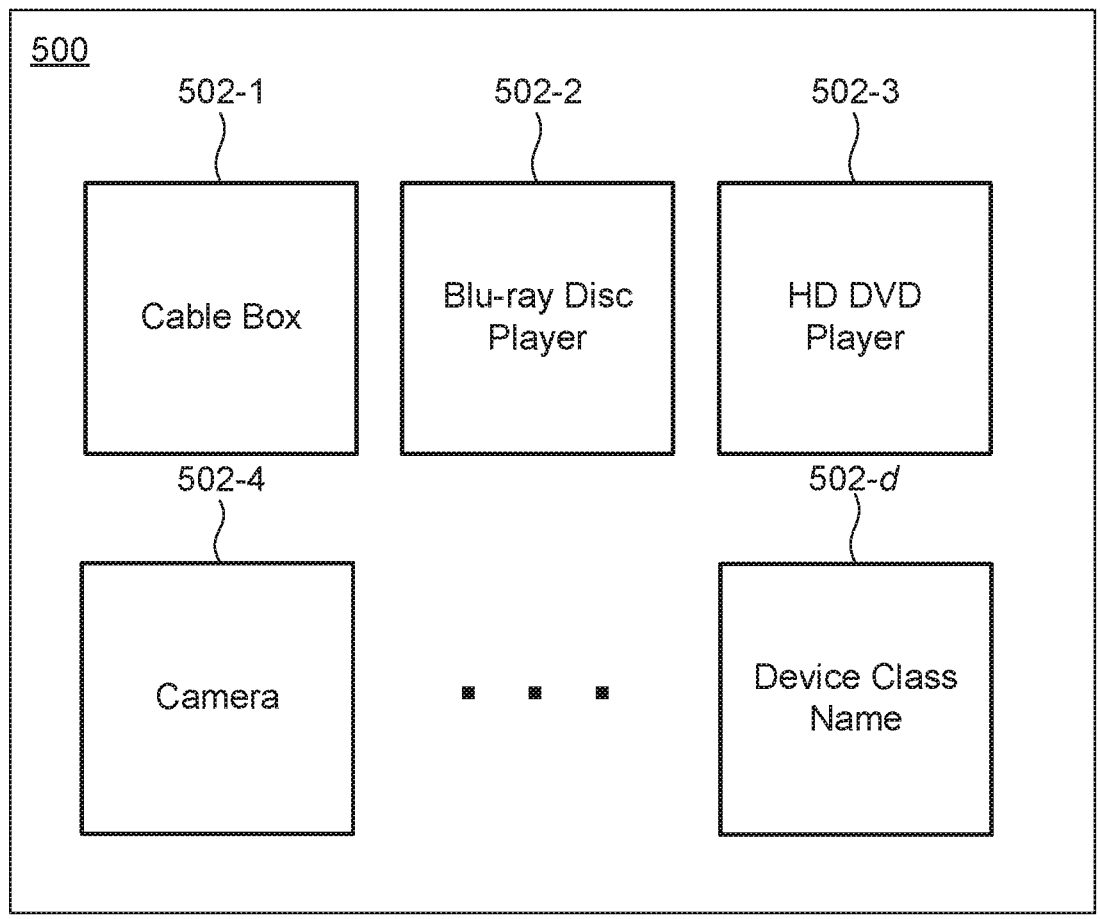
FIG. 5 illustrates connected device user interface view according to an example embodiment.

If the new device is cached (step 302—Yes), then in step 314, the display device 102-1 may update connected device user interface view 500 of FIG. 5. For example, if display device 102-1 finds the collected device fingerprint information for the newly connected device in the cached device representation database 214 stored in memory 210, then the display device 102-1 may add and/or modify one or more UI elements 502-d of the connected device user interface view 500 with device class representation information stored in cached device representation database 214 that corresponds to the newly connected device. This may enable a user to quickly and easily identify the newly connected device and select the newly connected device as an input source for the display device 102-1.

If the new device is not cached (step 302—No), then in step 303, the display device 102-1 may transmit a device fingerprint query to server 108 via network 106 to request device class representation information for the new device. For example, if the collected device fingerprint information is not found within the cached device representation database 214, then the display device 102-1 may transmit a device fingerprint query to server 108. In an embodiment, the device fingerprint query may include, without limitation, the device fingerprint information and a request for device class representation information for the new device. The device class representation information may include, without limitation, a device class name which may be a generic characterization or description of the new device connected to the display device 102-1 (e.g., cable box, Blue-ray disc player, HD DVD player, camera, personal computer, tablet computer, mobile phone, game console, etc.).

Additionally or alternatively, the device class name may include, without limitation, a generic characterization or description, along with a specific product or trademark name (e.g., game console—Xbox® 360, tablet computer—iPad®, mobile phone—Galaxy s5®, etc.). Additionally or alternatively, the device class representation information may further include, without limitation, a device class image which may be a easily recognized generic image associated with the device class name (e.g., a generic image of a cable box, Blue-ray disc player, HD DVD player, etc.) or a device specific or trademark image associated with the device class name (e.g., a product image for an Xbox® 360, an iPad®, a Galaxy S5®, etc.).

In step 304, the display device 102-1 may then wait for an indication or a response from the server 108 for a specific period of time or a timeout period (e.g., 30 seconds, 60 seconds, 1 minute, 2 minutes, etc.), where the indication or response may indicate whether device class representation information for the new device is available. If the device class representation information is available (step 304—Yes), then in step 305, the display device 102-1 may receive the device class representation information for the new device from the server 108.

In an embodiment, after receiving the device class representation information for the new device, in step 306, the display device 102-1 may optionally determine whether to supply or provide a prompt to the user based on received reliability indicia (discussed further below). For example, the display device 102-1 may optionally visually present device representation user interface view 400 of FIG. 4, which may include at least a portion of the device class representation information, when the reliability indicia of the received device class representation information is below a specific user configurable threshold (e.g., less than 90, less than 80, etc.) indicating a less reliable suggested device class representation information. This may enable a user to select an alternate device class name and/or device class image for the new device.

Additionally or alternatively, the display device 102-1 may not supply or provide a prompt to the user (step 306—No) and may directly skip to step 312 to store the received device class representation information for the new device. For example, the display device 102-1 may proceed to store the received device class representation information for the new device without visually presenting device representation user interface view 400 of FIG. 4, in response to receiving the device class representation information, when the reliability indicia of the received device class representation information is above a specific user configurable threshold (e.g., greater than 80, greater than 90, etc.) indicating a highly reliable suggested device class representation information. This may enable the display device 102-1 to automatically provide a representation (e.g., device class name and/or device class image) for a newly connected device that may be well known with high reliability and no user interaction. It may be appreciated that the display device 102-1 may also be optionally configured to always supply or provide prompt or to never supply or provide a prompt.

If the display device provides a prompt (step 306—Yes), then the user of the display device 102-1 may then be afforded the opportunity to accept (step 307—Yes) the suggested device class name and/or device class image received from server 108 or override (step 307—No) the suggested class name and/or device class image received from server 108. The acceptance of the suggested device class name and/or device class image may be represented as a device class representation acceptance signal and the override of the suggested device class name and/or device class image may be represented as a device class representation override signal.

Figure 4:
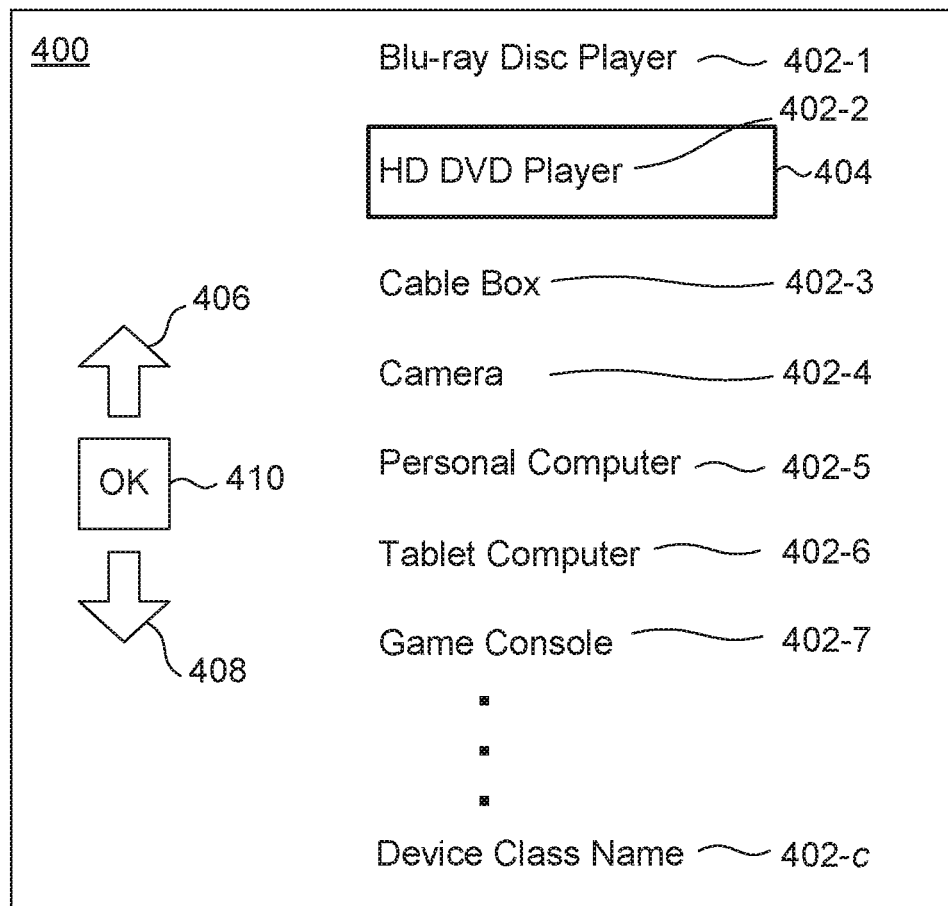
FIG. 4 illustrates a device representation user interface view according to an example embodiment.

FIG. 4 illustrates a device representation user interface view 400 that may be used to accept a suggested device class name and/or device class image or select a device class name and/or device class image according to an example embodiment. The user interface view 400 may be supplied or provided to a display associated with a display device (e.g., display device 102-1). The user interface view 400 may include a list of one or more device class names 402-c (e.g., "Blu-ray Disc Player" 402-1, "HD DVD Player" 402-2, "Cable Box" 402-3, "Camera" 402-4, "Personal Computer" 402-5, "Tablet Computer" 402-6, "Game Console" 402-7, and the like). Selection indicia 404 may initially select, as indicated by the highlighting, a suggested device class name and/or device class image in order to distinguish a suggested device class name and/or device class image from other available device class names and/or device class images. The selection indicia 404 may be a designated shape as shown in FIG. 4, or may vary with a change in shape, a change in font, a change in color, a special character and the like. The user interface view 400 may also allow or enable a selection of a device class name and/or device class image with an OK button 410, which may be selected through a remote control. Additionally or alternately, an up arrow button 406 and/or a down arrow button 408 may be used to scroll through and select a device class name and/or device class image in the list of one or more device class names 402-c.

Returning to FIG. 3 and as discussed above, the suggested device class name and/or device class name image received from server 108 may be initially selected by selection indicia 404. If the suggested device class name and/or device class image is accepted (step 307—Yes), then in step 312, display device 102-1 may store the device class representation information and corresponding device class fingerprint information in the cached device representation database 214. For example, the suggested device class name and/or device class image may be accepted by activating the OK button 410. Once the device class name and/or device class image is stored, the designated port operatively coupled and/or connected to the new device may be assigned the selected device class name and/or device class image. In step 314, the display device 102-1 may further update connected device user interface view 500 of FIG. 5 as previously discussed.

If the display device 102-1 receives an indication from the server 108 that device class representation information is not available (step 304—No) or no response is received within a specific period of time or a specific timeout period, then in step 308, the display device 102-1 may supply or provide a prompt and in step 309, wait for a device class name and/or device class image to be selected. For example, the display device 102-1 may supply or provide a prompt by visually presenting device representation user interface view 400 of FIG. 4, which may include the list of one or more device class names 402-c and/or device class images (not shown), where the user may select a device class name and/or device class image, in response to the received indication. Thus, a user may scroll through and highlight a device class name and/or device class image and select a highlighted device class name and/or device class image using up arrow button 406, down arrow button 408, the OK button 410, and/or the remote control, where the user selection may be represented as a device class representation selection signal.

If a device class name and/or device class image is selected (step 309—Yes), then in step 310, the display device 102-1 may upload the user selected device class name, device class image, and/or display device identifier. For example, the display device 102-1 may send or transmit the selected device class name, device class image, display device identifier associated with the display device 102-1 (e.g., an electronic serial number (ESN) of the display device 102-1, etc.) to server 108 via network 106. In step 312, the display device 102-1 may then store the selected device class name and/or device class image as device class representation information and the corresponding device fingerprint information in the cached device representation database 214. It may be appreciated that the processing associated with steps 310, 312, and/or 314 discussed above may also be performed by the display device 102-1, when the suggested device class name and/or device class image received from the server 108 is not accepted (step 307—No). In this case a different device class name and/or a different device class image may be selected or specified by the user of the display device 102-1, which may be represented as device class representation override signal as previously discussed.

It may be appreciated that while the processing operations performed in FIG. 3 were substantially discussed with respect to display device 102-1, the processing operations may also be performed by a component external to the display device 102-1. This external component may connect, communicate and interact with display device 102-1 either wirelessly or through a wired connection. For example, the external component may be a cable box or streaming media server device operatively coupled and/or connected to the display device 102-1. Additionally or alternatively, the external component may be a remote control (either a dedicated remote control or a cell phone, for example) associated with the display device 102-1.

It may be further appreciated that while the processing performed in FIG. 3 were substantially discussed with respect to display device 102-1, the process may also be repeated by the one or more display devices 102-n. Accordingly, server 108 may receive crowd sourced representation information regarding mappings between device fingerprint information and device class representation information from the one or more display devices 102-n.

FIG. 5 illustrates a connected device user interface view 500 that may be supplied, displayed or provided by the one or more display devices 102-n according to an example embodiment. Connected device user interface view 500 may supply or provide one or more UI elements 502-d, which may be visually represented as one or more input tiles or tile icons to allow a user to select a port as an input source (e.g., select using a remote control, etc.) for visual presentation on the display device (e.g., display device 102-1), where each port may be represented by one of the UI elements 502-d and each port may be operatively coupled and/or connected to one of the devices (e.g., devices 102-a-1, 102-b-2, etc.).

To allow a user to quickly and easily identify a connected device (e.g., device 102-1-1, 102-2-1, etc.), each UI element (e.g., UI element 502-1, 502-2, etc.) may include or specify at least a portion of the device class representation information, such as, for example, a device class name and/or a device class image. By way of example, the UI element 502-1 may include "Cable Box" for a device class name and/or an image of a cable box for a device class image (not shown), UI element 502-2 may include "Blu-ray Disc Player" for a device class name and/or an image of a Blu-ray Disc Player for a device class image (not shown), UI element 502-3 may include "HD DVD Player" for a device class name and/or an image of a HD DVD Player for a device class image (not shown), UI element 502-4 may include "Camera" for a device class name and/or an image of a Camera for a device class image (not shown) and so forth. The examples are not limited in this context.

In an embodiment, the selection of one of the UI elements 502-d may enable the display device (e.g., display device 102-1) to receive and output (via an acoustic transducer and/or display operatively coupled to the A/V circuitry 212) audio and/or video information from the corresponding operatively coupled and/or connected device (e.g., device 102-1-1) represented by the selected UI element. As previously discussed, the device class representation information and corresponding device fingerprint information may be established using the processing operations of FIG. 3, where the information may be stored in the cached device representation database 214 and/or otherwise available from the server 108. As such, the device fingerprint information and corresponding device class representation information for one or more devices (e.g., device 102-a-1, 102-b-2, etc.) may be considered to be permanently available to the one or more display devices 102-n.

Figure 6:
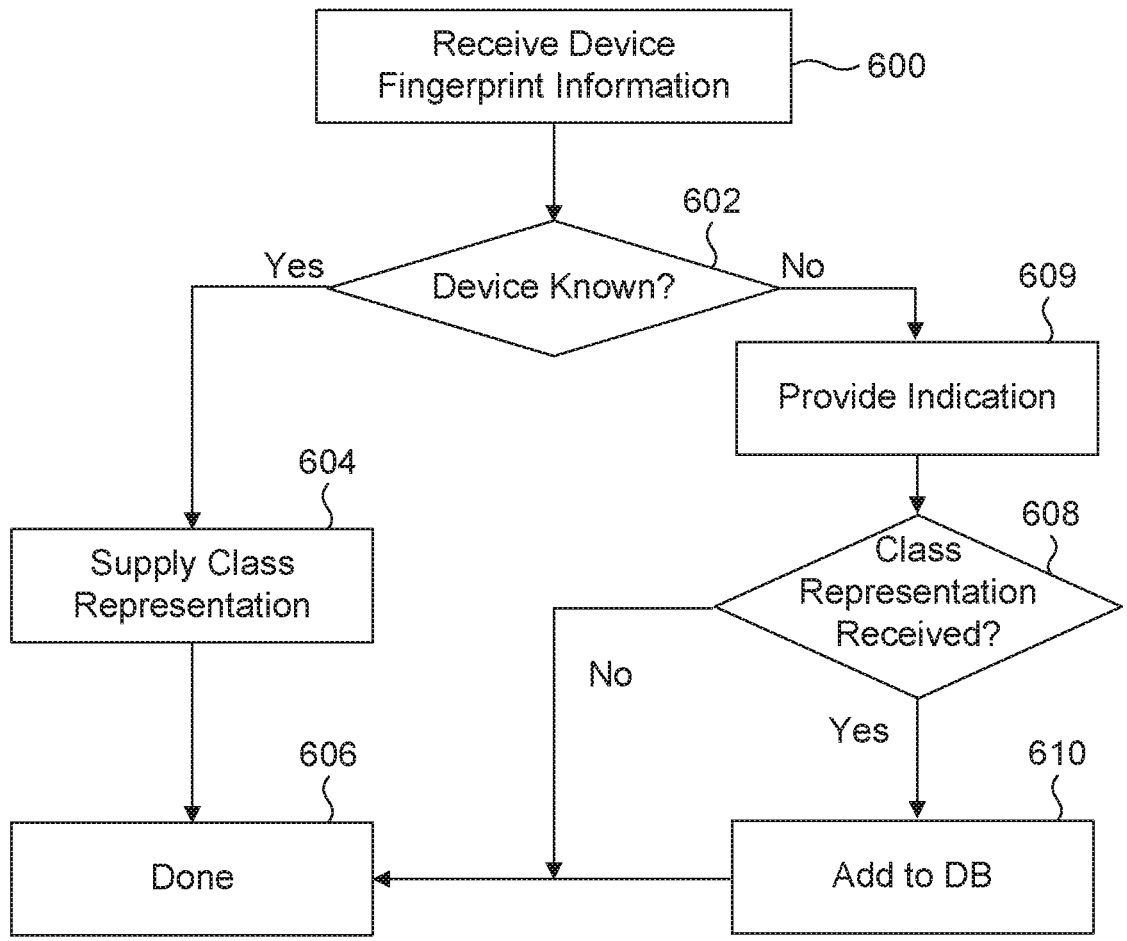
FIG. 6 illustrates processing operations associated with a server configured according to an example embodiment.

FIG. 6 illustrates processing operations associated with an embodiment of the server 108 according to an example embodiment.

In step 600, the server 108 may receive device fingerprint information from one or more display devices 102-n in accordance with a crowd sourcing mode of operation. For example, when one or more display devices 102-n have a newly connected device (e.g., device 104-1-1, etc.), the server 108 may receive device fingerprint information uploaded to server 108 by the one or more display devices 102-n.

In step 602, the server 108 may determine whether the device is known. For example, the collection module 122 may receive the device fingerprint information from the one or more display devices 102-n and then compare the received device fingerprint information to device fingerprint information stored in the device representation database 124 utilizing, for example, one or more database queries.

If the device is known, i.e., a match is found within the device representation database 124 (step 602—Yes), then in step 604, the device class representation information corresponding to the received device fingerprint information may be supplied or provided. For example, the feedback module 126 may supply or send the corresponding device class representation information stored in the device representation database 124 to the designated display device (e.g., display device 102-1) via network 106.

If the device is not known, i.e., match is not found within the device representation database 124 (step 602—No), then in step 609, the server 108 may provide an indication to the designated display device (e.g., display device 102-1) that the new device (e.g., device 104-1-1) is not known. For example, the server 108 may provide an indication or a response to the designed display device that the received device fingerprint information is not found or otherwise unavailable.

In step 608, the server 108 may wait to determine if device class representation information is received. For example, the collection module 122 may wait for a specific period of time or a timeout period (e.g., 30 seconds, 60 seconds, 1 minute, 2 minutes, etc.) for the operations associated with steps 308, 309, and 310 of FIG. 3 to be completed. If the user selects a device class name and/or a device class image, then the server 108 may receive the user selected device class name and/or device class image represented by device class representation information uploaded from the designated display device (e.g., display device 102-1) via network 106.

If the server 108 receives device class representation information from the designed display device (e.g., display device 102-1) (step 608—Yes), then in step 610, the device class representation information and corresponding device fingerprint information may be added to device representation database 124. For example, the collection module 122 may add the device class representation information and corresponding device fingerprint information to the device representation database 124, where the device class representation information may be associated with the device fingerprint information in the device representation database 124.

In an embodiment, referring back to FIG. 1, the feedback module 126 may be configured to automatically and periodically generate device class representation reliability indicia and/or update mappings between a device class name and/or device class image and corresponding device fingerprint information based on one or more reliability factors, where the reliability indicia may include a normalized value (e.g., numerical value between 0 and 100, etc.) to indicate the trustworthiness of a suggested device class name and/or device class image. For example, the feedback module 126 may perform an evaluation of device class representation information and corresponding device fingerprint information stored in the device representation database 124. Additionally or alternatively, the feedback module 126 may also enable an administrator (e.g., a data analyst, etc.) to manually map a device class name and/or device class image to their corresponding device fingerprint information, which may be uploaded to one or more display devices 102-n.

In an embodiment, the one or more reliability factors may include, without limitation, a submission factor, i.e., whether the same device fingerprint information has been received for a threshold number (e.g., at least 100, 200, etc.) of times, a consistency factor, i.e., whether a threshold proportion (e.g., at least 70%, 80%, etc.) of the same device fingerprint information corresponds to or maps to the same device class representation information (e.g., same device class name, same device class image, etc.), a uniqueness factor, i.e., whether a threshold proportion (at least 95%, 85%, etc.) of the same device fingerprint information were received from distinct display devices 102-*n* having distinct display device identifiers (e.g., electronic signature numbers (ESN), etc.), and/or any combination thereof.

By way of example, a strong reliability indicia (e.g., a high value, etc.) for a device class name and/or device class image may be associated with a large set of device fingerprint information with consistent designation of a single device class name and/or device class image, where a great majority of the large set of device fingerprint information are unique, i.e., received from distinct display devices 102-*n*. Alternately, a weak reliability indicia for a device class name and/or device class image may be associated with a small set of device fingerprint information and/or inconsistent designation of a single device class name and/or device class image, where only a small proportion of the small set of device fingerprint information are unique.

The reliability indicia may be supplied or provided to the display device (e.g., display device 102-1) along with device class name and/or device class image represented as device class representation information via the network 106. The reliability indicia may be utilized by the feedback module 126 to determine reliable patterns in mappings between device class names and/or device class images and corresponding device fingerprint information, so that the feedback module 126 may provide the most reliable suggested device class name and/or device class image for a corresponding device fingerprint information to the one or more display devices 102-*n*. As previously discussed, the reliability indicia may also be utilized by the one or more display devices 102-*n* to determine whether to automatically assign a port with a suggested device class name and/or device class image or provide a prompt to request a user selected device class name and/or device class image. Additionally, the display devices 102-*n* may also visually present the reliability indicia in substantial proximity (e.g., left side, ride side, etc.) to the corresponding suggested display class name and/or display class image in the device representation user interface view 400 of FIG. 4 so that the user may make an informed choice in selecting a suggested device class name and/or device class image. It may be appreciated that the displayed reliability indicia may be a percentage confidence level, a graphical representation of device class name confidence, and the like.

Example Computer System

Various embodiments and components therein can be implemented, for example, using one or more well-known computer systems, such as computer system 700 shown in FIG. 7. Computer system 700 can be any well-known computer capable of performing the functions described herein. Computer system 700 may also be internal or external to a display device (e.g., display device 102-1, 102-2, etc.) as discussed above.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. An apparatus, comprising:
a memory; and
at least one processor coupled to the memory and configured to:
receive, from a first display device for a first multimedia device, a first device fingerprint information and a corresponding first device class representation information,
receive, from a second display device for a second multimedia device, a second device fingerprint information and a corresponding second device class representation information,
store the first and the second device fingerprint information and the first and the second device class representation information as a crowd sourced representation information in a device representation database,
determine that a third multimedia device with a corresponding third device fingerprint information is a known multimedia device based at least on a comparison of the third device fingerprint information with the crowd sourced representation information, and
transmit, to a third display device, a third device class representation information that corresponds to the third device fingerprint information based at least on the determination that the third multimedia device operatively coupled to the third display device is the known multimedia device.

2. The apparatus of claim 1, wherein
the first device class representation information includes a first device class name that is selected for the first multimedia device, and
the second device class representation information includes a second device class name that is selected for the second multimedia device.

3. The apparatus of claim 2, wherein
the first device class name is selected by a first user of the first display device,
the second device class name is selected by a second user of the second display device, and
the selected first device class name is the same as the selected second device class name.

4. The apparatus of claim 3, the at least one processor further configured to:
receive, from the third display device, the third device fingerprint information, wherein the third device fingerprint information is collected from the third multimedia device operatively coupled to the third display device;
compare the third device fingerprint information with the crowd sourced representation information stored in the device representation database; and
determine whether a match for the third display device is found within the device representation database based at least on the comparison of the third device fingerprint information with the crowd sourced representation information.

5. The apparatus of claim 4, wherein
the first device class representation information further includes a first device class image associated with the first device class name, and
the crowd sourced representation information includes an aggregate of at least the first and the second device fingerprint information and the first and the second device class representation information for at least the first and the second multimedia devices.

6. The apparatus of claim 5, wherein
the first device class name is a generic description of the first multimedia device connected to the first display device, the first device class image is a generic image associated with the first device class name, and the first device fingerprint information includes at least one of a vendor identifier, a product identifier, and/or an on screen display information.

7. The apparatus of claim 1, wherein the first device fingerprint information is collected from the first multimedia device operatively coupled to the first display device, and the second device fingerprint information is collected from the second multimedia device operatively coupled to the second display device.

8. A computer-implemented method, comprising:

receiving, from a first display device for a first multimedia device, a first device fingerprint information and a corresponding first device class representation information;

receiving, from a second display device for a second multimedia device, a second device fingerprint information and a corresponding second device class representation information;

storing the first and the second device fingerprint information and the first and the second device class representation information as a crowd sourced representation information in a device representation database;

determining that a third multimedia device with a corresponding third device fingerprint information is a known multimedia device based at least on a comparison of the third device fingerprint information with the crowd sourced representation information; and transmitting, to a third display device, a third device class representation information that corresponds to the third device fingerprint information based at least on the determination that the third multimedia device operatively coupled to the third display device is the known multimedia device.

9. The computer-implemented method of claim 8, wherein the first device class representation information includes a first device class name that is selected for the first multimedia device, and the second device class representation information includes a second device class name that is selected for the second multimedia device.

10. The computer-implemented method of claim 9, wherein the second device class name is a generic description of the second multimedia device connected to the second display device, and the second device fingerprint information includes at least one of a vendor identifier, a product identifier, and/or an on screen display information.

11. The computer-implemented method of claim 10, further comprising:

receiving, from the third display device, the third device fingerprint information, wherein the third device fingerprint information is collected from the third multimedia device operatively coupled to the third display device;

comparing the third device fingerprint information with the crowd sourced representation information stored in the device representation database; and determining whether a match for the third display device is found within the device representation database based at least on the comparison of the third device fingerprint information with the crowd sourced representation information.

12. The computer-implemented method of claim 11, wherein the first device fingerprint information is collected from the first multimedia device operatively coupled to the first display device, and the second device fingerprint information is collected from the second multimedia device operatively coupled to the second display device.

13. The computer-implemented method of claim 9, wherein the first device class representation information further includes a first device class image associated with the first device class name.

14. The computer-implemented method of claim 13, wherein the first device class name is a generic description of the first multimedia device connected to the first display device, the first device class image is a generic image associated with the first device class name, and the first device fingerprint information includes at least one of a vendor identifier, a product identifier, and/or an on screen display information.

15. A non-transitory computer readable medium having instructions stored thereon, that, when executed on a computing device cause the computing device to perform operations, the operations comprising:

receiving, from a first display device for a first multimedia device, a first device fingerprint information and a corresponding first device class representation information;

receiving, from a second display device for a second multimedia device, a second device fingerprint information and a corresponding second device class representation information;

storing the first and the second device fingerprint information and the first and the second device class representation information as a crowd sourced representation information in a device representation database;

determining that a third multimedia device with a corresponding third device fingerprint information is a known multimedia device based at least on a comparison of the third device fingerprint information with the crowd sourced representation information; and transmitting, to a third display device, a third device class representation information that corresponds to the third device fingerprint information based at least on the determination that the third multimedia device connected to the third display device is the known multimedia device.

16. The non-transitory computer readable medium of claim 15, wherein the first device class representation information includes a first device class name that is selected for the first multimedia device, and the second device class representation information includes a second device class name that is selected for the second multimedia device.

17. The non-transitory computer readable medium of claim 16, wherein the first device class name is selected by a first user of the first display device, the second device class name is selected by a second user of the second display device, and the selected first device class name is the same as the selected second device class name.

18. The non-transitory computer readable medium of claim 17, wherein the operations further comprise:
- receiving, from the third display device, the third device fingerprint information, wherein the third device fingerprint information is collected from the third multimedia device operatively coupled to the third display device;
- comparing the third device fingerprint information with the crowd sourced representation information stored in the device representation database; and
- determining whether a match for the third display device is found within the device representation database based at least on the comparison of the third device fingerprint information with the crowd sourced representation information.

19. The non-transitory computer readable medium of claim 18, wherein
- the first device class representation information further includes a first device class image associated with the first device class name, and
- the crowd sourced representation information includes an aggregate of at least the first and the second device fingerprint information and the first and the second device class representation information for at least the first and the second multimedia devices.

20. The non-transitory computer readable medium of claim 16, wherein the operations further comprise:
- generating a reliability indicia between a third device class name and the third device fingerprint information based at least on one or more reliability factors, wherein the one or more reliability factors include a submission factor, a consistency factor, and/or a uniqueness factor; and
- providing the reliability indicia associated with the third device fingerprint information to the third display device.

* * * * *